US008856646B2

(12) United States Patent
Thomas et al.

(10) Patent No.: US 8,856,646 B2
(45) Date of Patent: Oct. 7, 2014

(54) ASSET TRANSITION PROJECT MANAGEMENT

(75) Inventors: Shawn Thomas, Austin, TX (US); Michael Woodfin, Austin, TX (US)

(73) Assignee: Caldvor Acquisitions Ltd., LLC, Dover, DE (US)

( * ) Notice: Subject to any disclaimer, the term of this patent is extended or adjusted under 35 U.S.C. 154(b) by 25 days.

(21) Appl. No.: 12/056,969

(22) Filed: Mar. 27, 2008

(65) Prior Publication Data

US 2008/0177753 A1    Jul. 24, 2008

Related U.S. Application Data

(63) Continuation of application No. 10/321,037, filed on Dec. 17, 2002, now abandoned.

(60) Provisional application No. 60/342,031, filed on Dec. 18, 2001.

(51) Int. Cl.

| G06F 17/00 | (2006.01) |
|---|---|
| G06Q 40/02 | (2012.01) |
| G06Q 10/06 | (2012.01) |
| G06F 17/30 | (2006.01) |
| G06Q 30/02 | (2012.01) |
| G06Q 99/00 | (2006.01) |
| G06F 9/445 | (2006.01) |
| G06F 17/24 | (2006.01) |
| G06F 17/21 | (2006.01) |

(52) U.S. Cl.
CPC ............... *G06F 17/30* (2013.01); *G06F 17/24* (2013.01); *Y10S 707/99948* (2013.01); *G06Q 40/02* (2013.01); *G06Q 10/06* (2013.01); *G06F 17/211* (2013.01); *G06Q 30/02* (2013.01); *G06Q 99/00* (2013.01); *G06F 9/4451* (2013.01)
USPC ............... 715/255; 715/200; 715/201; 705/1; 705/8; 705/9; 705/28; 705/29; 707/104.1; 707/999.107

(58) Field of Classification Search
CPC ........ G06F 17/30; G06F 17/24; G06F 17/211
USPC .......... 715/200–201, 255; 705/1, 8–9, 28–29; 707/104.1
See application file for complete search history.

(56) References Cited

U.S. PATENT DOCUMENTS

| 4,558,413 A | 12/1985 | Schmidt et al. |
|---|---|---|
| 4,653,112 A | 3/1987 | Ouimette |

(Continued)

FOREIGN PATENT DOCUMENTS

| CN | 1204410 | 1/1999 |
|---|---|---|
| EP | 0836140 | 4/1998 |

(Continued)

OTHER PUBLICATIONS

Lubanski et al, "SMS 2 Adminstration", Feb. 17, 2000, Sams, 5 pages + 1 cover page (6 pages total).*

(Continued)

*Primary Examiner* — William Bashore
*Assistant Examiner* — David Faber
(74) *Attorney, Agent, or Firm* — Perkins Coie LLP

(57) ABSTRACT

The method and system of the present invention provides an improved method for asset transition project management. Information is aggregated from a variety of sources into a centralized computerized database. Thereafter, assets that are electronically connected to the computerized database are monitored. If a transition occurs, information concerning the transition is input into the computerized database on a real-time basis during the implementation of the transition. The information input into the computerized database can be used to manage the transition.

18 Claims, 5 Drawing Sheets

(56) References Cited

U.S. PATENT DOCUMENTS

| | | | |
|---|---|---|---|
| 4,695,946 | A | 9/1987 | Andreasen et al. |
| 4,714,995 | A | 12/1987 | Materna et al. |
| 5,005,122 | A | 4/1991 | Griffin et al. |
| 5,019,963 | A | 5/1991 | Alderson et al. |
| 5,133,075 | A | 7/1992 | Risch |
| 5,155,847 | A | 10/1992 | Kirouac et al. |
| 5,249,290 | A | 9/1993 | Heizer |
| 5,278,982 | A | 1/1994 | Daniels |
| 5,339,176 | A | 8/1994 | Smilansky et al. |
| 5,355,498 | A | 10/1994 | Provino |
| 5,414,843 | A | 5/1995 | Nakamura et al. |
| 5,586,322 | A | 12/1996 | Beck et al. |
| 5,664,113 | A * | 9/1997 | Worger et al. .................. 705/28 |
| 5,673,382 | A | 9/1997 | Cannon |
| 5,678,002 | A | 10/1997 | Fawcett et al. |
| 5,752,244 | A | 5/1998 | Rose |
| 5,778,395 | A | 7/1998 | Whiting et al. |
| 5,784,578 | A | 7/1998 | Galloway |
| 5,787,234 | A | 7/1998 | Molloy |
| 5,787,491 | A | 7/1998 | Merkin et al. |
| 5,793,951 | A | 8/1998 | Stein et al. |
| 5,799,147 | A | 8/1998 | Shannon |
| 5,819,020 | A | 10/1998 | Beeler |
| 5,852,811 | A | 12/1998 | Atkins |
| 5,864,828 | A | 1/1999 | Atkins |
| 5,881,285 | A | 3/1999 | Deleeuw |
| 5,884,285 | A | 3/1999 | Atkins |
| 5,893,904 | A | 4/1999 | Harris |
| 5,893,906 | A | 4/1999 | Daffin |
| 5,909,669 | A | 6/1999 | Havens |
| 5,911,135 | A | 6/1999 | Atkins |
| 5,911,136 | A | 6/1999 | Atkins |
| 5,920,700 | A | 7/1999 | Gordon et al. |
| 5,923,850 | A | 7/1999 | Barroux |
| 5,930,342 | A | 7/1999 | Mazzapica |
| 5,959,275 | A | 9/1999 | Hughes |
| 5,974,536 | A | 10/1999 | Richardson |
| 5,974,563 | A | 10/1999 | Beeler, Jr. |
| 6,016,500 | A | 1/2000 | Waldo |
| 6,026,500 | A | 2/2000 | Topff |
| 6,038,551 | A | 3/2000 | Barlow |
| 6,038,665 | A | 3/2000 | Bolt et al. |
| 6,049,784 | A | 4/2000 | Weatherly et al. |
| 6,052,694 | A | 4/2000 | Bromberg |
| 6,061,693 | A | 5/2000 | Carney et al. |
| 6,108,641 | A | 8/2000 | Kenna |
| 6,110,229 | A | 8/2000 | Yamaguchi |
| 6,118,447 | A | 9/2000 | Harel |
| 6,128,661 | A | 10/2000 | Flanagin et al. |
| 6,145,126 | A | 11/2000 | Matsukura et al. |
| 6,161,176 | A | 12/2000 | Hunter et al. |
| 6,181,336 | B1 | 1/2001 | Chiu |
| 6,182,212 | B1 | 1/2001 | Atkins |
| 6,185,576 | B1 | 2/2001 | McIntosh |
| 6,189,008 | B1 | 2/2001 | Easty |
| 6,212,280 | B1 | 4/2001 | Howard |
| 6,220,768 | B1 | 4/2001 | Barroux |
| 6,230,287 | B1 | 5/2001 | Pinard et al. |
| 6,237,009 | B1 | 5/2001 | Waldo et al. |
| 6,237,617 | B1 | 5/2001 | Sturman et al. |
| 6,252,694 | B1 | 6/2001 | Shinada |
| 6,256,773 | B1 | 7/2001 | Bowman-Amuah |
| 6,266,774 | B1 | 7/2001 | Sampath |
| 6,281,874 | B1 | 8/2001 | Sivan et al. |
| 6,281,894 | B1 | 8/2001 | Rive |
| 6,289,378 | B1 | 9/2001 | Meyer et al. |
| 6,327,579 | B1 | 12/2001 | Crawford |
| 6,327,617 | B1 | 12/2001 | Fawcett |
| 6,330,566 | B1 | 12/2001 | Durham |
| 6,351,776 | B1 | 2/2002 | O'Brien et al. |
| 6,363,498 | B1 | 3/2002 | Howell |
| 6,363,499 | B1 | 3/2002 | Delo |
| 6,366,916 | B1 | 4/2002 | Baer |
| 6,370,646 | B1 | 4/2002 | Goodman |
| 6,373,416 | B1 | 4/2002 | McGrath et al. |
| 6,373,434 | B1 | 4/2002 | Hayakawa et al. |
| 6,374,263 | B1 | 4/2002 | Bunger et al. |
| 6,381,597 | B1 | 4/2002 | Lin |
| 6,381,644 | B2 | 4/2002 | Munguia |
| 6,385,621 | B1 | 5/2002 | Frisina |
| 6,385,707 | B1 | 5/2002 | Maffezzoni |
| 6,411,936 | B1 | 6/2002 | Sanders |
| 6,438,749 | B1 | 8/2002 | Chamberlain |
| 6,470,387 | B1 * | 10/2002 | Fischer .................. 709/224 |
| 6,473,794 | B1 | 10/2002 | Guheen et al. |
| 6,490,587 | B2 | 12/2002 | Easty |
| 6,499,049 | B2 | 12/2002 | Waldo |
| 6,502,096 | B1 | 12/2002 | Siefert |
| 6,519,600 | B1 | 2/2003 | Siefert |
| 6,532,543 | B1 | 3/2003 | Smith |
| 6,539,369 | B2 | 3/2003 | Brown |
| 6,553,375 | B1 | 4/2003 | Huang et al. |
| 6,557,008 | B1 | 4/2003 | Temple |
| 6,571,276 | B1 | 5/2003 | Burns |
| 6,574,522 | B1 | 6/2003 | Douglas |
| 6,609,090 | B1 | 8/2003 | Hickman et al. |
| 6,615,253 | B1 | 9/2003 | Bowman-Amuah |
| 6,625,622 | B1 | 9/2003 | Henrickson |
| 6,633,977 | B1 | 10/2003 | Hamilton |
| 6,636,857 | B2 | 10/2003 | Thomas |
| 6,640,244 | B1 | 10/2003 | Bowman-Amuah |
| 6,650,622 | B1 | 11/2003 | Austerman |
| 6,651,050 | B2 | 11/2003 | Shafrir et al. |
| 6,654,802 | B1 | 11/2003 | Oliva |
| 6,662,357 | B1 | 12/2003 | Bowman-Amuah |
| 6,691,064 | B2 | 2/2004 | Vroman |
| 6,708,171 | B1 | 3/2004 | Waldo et al. |
| 6,728,877 | B2 | 4/2004 | Mackin et al. |
| 6,754,696 | B1 | 6/2004 | Kamath et al. |
| 6,782,394 | B1 | 8/2004 | Landeck et al. |
| 6,829,734 | B1 | 12/2004 | Kreulen et al. |
| 6,856,970 | B1 * | 2/2005 | Campbell et al. .................. 705/35 |
| 6,871,322 | B2 | 3/2005 | Gusler et al. |
| 6,882,961 | B2 | 4/2005 | Cobble et al. |
| 6,901,416 | B2 | 5/2005 | Tsai et al. |
| 7,080,372 | B1 | 7/2006 | Cole |
| 7,110,353 | B1 | 9/2006 | Deschaine et al. |
| 7,140,044 | B2 | 11/2006 | Redlich et al. |
| 7,415,509 | B1 | 8/2008 | Kaltenmark et al. |
| 7,467,198 | B2 | 12/2008 | Goodman et al. |
| 8,266,066 | B1 * | 9/2012 | Wezter et al. .................. 705/78 |
| 2001/0007128 | A1 | 7/2001 | Lambert et al. |
| 2001/0012337 | A1 | 8/2001 | Horie |
| 2001/0026619 | A1 | 10/2001 | Howard |
| 2001/0029474 | A1 | 10/2001 | Yada |
| 2001/0037333 | A1 | 11/2001 | Nishimura |
| 2001/0052013 | A1 | 12/2001 | Munguia |
| 2002/0010808 | A1 | 1/2002 | Wiggins et al. |
| 2002/0010863 | A1 | 1/2002 | Mankefors |
| 2002/0013801 | A1 | 1/2002 | Kobayashi et al. |
| 2002/0038267 | A1 | 3/2002 | Can et al. |
| 2002/0059230 | A1 * | 5/2002 | Hunepohl et al. .................. 707/6 |
| 2002/0065736 | A1 | 5/2002 | Willner et al. |
| 2002/0065825 | A1 | 5/2002 | Kassan |
| 2002/0073114 | A1 | 6/2002 | Nicastro et al. |
| 2002/0082966 | A1 | 6/2002 | O'Brien |
| 2002/0082997 | A1 | 6/2002 | Kobata |
| 2002/0083102 | A1 | 6/2002 | Vetter |
| 2002/0091699 | A1 | 7/2002 | Norton |
| 2002/0099934 | A1 | 7/2002 | Cromer |
| 2002/0104080 | A1 | 8/2002 | Woodard |
| 2002/0123983 | A1 | 9/2002 | Riley |
| 2002/0143421 | A1 | 10/2002 | Wetzer |
| 2002/0143598 | A1 | 10/2002 | Scheer |
| 2002/0143775 | A1 | 10/2002 | Wilkinson |
| 2002/0143782 | A1 | 10/2002 | Headings |
| 2002/0147601 | A1 * | 10/2002 | Fagan .................. 705/1 |
| 2002/0152151 | A1 | 10/2002 | Baughman |
| 2002/0152229 | A1 | 10/2002 | Peng |
| 2002/0161600 | A1 | 10/2002 | Stubiger |
| 2002/0169714 | A1 | 11/2002 | Ike et al. |
| 2002/0178364 | A1 | 11/2002 | Weiss |
| 2002/0184619 | A1 | 12/2002 | Meyerson |
| 2002/0184652 | A1 | 12/2002 | Cezeaux |

(56) References Cited

U.S. PATENT DOCUMENTS

| | | |
|---|---|---|
| 2002/0194194 A1 | 12/2002 | Fenton |
| 2002/0198997 A1 | 12/2002 | Linthicum |
| 2003/0004925 A1 | 1/2003 | Knoblock et al. |
| 2003/0009455 A1 | 1/2003 | Carlson |
| 2003/0009540 A1 | 1/2003 | Benfield et al. |
| 2003/0014508 A1 | 1/2003 | Cheston |
| 2003/0018746 A1 | 1/2003 | Boesch |
| 2003/0046371 A1 | 3/2003 | Falkner |
| 2003/0055749 A1 | 3/2003 | Carmody |
| 2003/0056140 A1 | 3/2003 | Taylor et al. |
| 2003/0061159 A1 | 3/2003 | Adams |
| 2003/0079132 A1 | 4/2003 | Bryant et al. |
| 2003/0084067 A1 | 5/2003 | Obiaya |
| 2003/0084460 A1 | 5/2003 | Chung |
| 2003/0093521 A1 | 5/2003 | Schlonski |
| 2003/0093688 A1 | 5/2003 | Helgesen et al. |
| 2003/0110169 A1 | 6/2003 | Zuili |
| 2003/0120677 A1 | 6/2003 | Vernon |
| 2003/0120684 A1 | 6/2003 | Zuili |
| 2003/0126047 A1 | 7/2003 | Hollar |
| 2003/0126048 A1 | 7/2003 | Hollar |
| 2003/0130820 A1 | 7/2003 | Lane |
| 2003/0139985 A1 | 7/2003 | Hollar |
| 2003/0140031 A1 | 7/2003 | Thomas |
| 2003/0140046 A1 | 7/2003 | Thomas |
| 2003/0140052 A1 | 7/2003 | Thomas |
| 2003/0140057 A1 | 7/2003 | Thomas |
| 2003/0140150 A1 | 7/2003 | Kemp |
| 2003/0154199 A1 | 8/2003 | Thomas |
| 2003/0167323 A1 | 9/2003 | Motoyama |
| 2003/0172020 A1 | 9/2003 | Davies |
| 2003/0182020 A1 | 9/2003 | Davis |
| 2003/0182211 A1 | 9/2003 | Sakurazawa |
| 2003/0187758 A1 | 10/2003 | McKalko |
| 2003/0195764 A1 | 10/2003 | Baker |
| 2003/0200274 A1 | 10/2003 | Henrickson |
| 2003/0200299 A1 | 10/2003 | Jamison |
| 2003/0200304 A1 | 10/2003 | Thorpe |
| 2003/0216976 A1 | 11/2003 | Ehrman |
| 2003/0217042 A1 | 11/2003 | Thomas |
| 2003/0217062 A1 | 11/2003 | Thomas |
| 2003/0225707 A1 | 12/2003 | Ehrman |
| 2003/0225927 A1 | 12/2003 | Goodman |
| 2003/0233287 A1 | 12/2003 | Sadler |
| 2003/0237022 A1 | 12/2003 | Thayer |
| 2004/0001088 A1 | 1/2004 | Stancil |
| 2004/0012808 A1 | 1/2004 | Payne |
| 2004/0024657 A1 | 2/2004 | Wright |
| 2004/0044688 A1 | 3/2004 | Brudz |
| 2004/0049578 A1 | 3/2004 | Ohara |
| 2004/0143428 A1 | 7/2004 | Rappaport et al. |
| 2005/0114468 A1 | 5/2005 | Philyaw |
| 2010/0169981 A1 | 7/2010 | Thomas et al. |
| 2011/0047170 A1 | 2/2011 | Thomas et al. |
| 2012/0016962 A1 | 1/2012 | Thomas et al. |
| 2012/0179794 A1 | 7/2012 | Thomas et al. |
| 2013/0055236 A1 | 2/2013 | Thomas et al. |

FOREIGN PATENT DOCUMENTS

| | | |
|---|---|---|
| EP | 0881567 | 12/1998 |
| EP | 1197886 | 4/2002 |
| EP | 1255196 | 6/2002 |
| EP | 1 251 656 | 10/2002 |
| EP | 1 255 196 | 11/2002 |
| GB | 2340273 | 2/2000 |
| GB | 2340273 A | 2/2000 |
| JP | 03173273 | 6/2003 |
| WO | PCT/AU97/00594 | 3/1998 |
| WO | WO-9812656 | 3/1998 |
| WO | PCT/US98/09517 | 11/1998 |
| WO | WO-9853396 | 11/1998 |
| WO | PCT/US00/11140 | 11/2000 |
| WO | PCT/US00/12806 | 11/2000 |
| WO | WO-0065438 | 11/2000 |
| WO | WO-0068816 | 11/2000 |
| WO | PCT/US00/07471 | 5/2001 |
| WO | PCT/US00/29146 | 5/2001 |
| WO | PCT/US00/32324 | 5/2001 |
| WO | WO-0131482 | 5/2001 |
| WO | WO-0131494 | 5/2001 |
| WO | PCT/US01/13809 | 11/2001 |
| WO | PCT/US01/14171 | 11/2001 |
| WO | WO-0184274 | 11/2001 |
| WO | WO-0184278 | 11/2001 |
| WO | PCT/US01/16629 | 3/2002 |
| WO | PCT/US01/32576 | 4/2002 |
| WO | PCT/US02/08663 | 10/2002 |
| WO | PCT/US02/15822 | 12/2002 |
| WO | PCT/US02/20487 | 1/2003 |
| WO | PCT/US02/40817 | 1/2003 |
| WO | PCT/US02/40820 | 2/2003 |
| WO | WO-03052560 | 2/2003 |
| WO | PCT/US02/30857 | 4/2003 |
| WO | WO-03029922 | 4/2003 |
| WO | PCT/US02/37197 | 5/2003 |
| WO | WO-03044718 | 5/2003 |
| WO | PCT/SG02/00278 | 6/2003 |
| WO | WO-03046681 | 6/2003 |
| WO | WO-03052557 | 6/2003 |
| WO | WO-03052559 | 6/2003 |
| WO | WO-03052601 | 6/2003 |
| WO | WO 03/096179 | 11/2003 |
| WO | WO-03002555 | 12/2003 |
| WO | WO-2004001589 | 12/2003 |

OTHER PUBLICATIONS

"Non-Final Office Action", U.S. Appl. No. 10/321,107, (May 17, 2009),11 pages.

Oppliger, R. "Security at the Internet Layer", Federal Office of Information Technology and Systems; Computer, vol. 31, Issue 9, pp. 43-47, Sep. 1998; ISSN: 0018-9162; http://ieexplore.ieee.org.

Aguilar, Rautert and Pater, "Business Process Simulation: A Fundamental Step Supporting Process Centered Management," Proceedings of the 1999 Winter Simulation Conference, pp. 1383-1392; Business Process Architecture Project, Winter 1999.

International Search Report, PCT/US02/40601, 3 pages, dated Nov. 24, 2003.

Lubanski, Mike and Doshi, Darshan, "SMS 2 Administration," 2000, New Riders Publishing, 6 pages, Chapter 1.

Codd, E.F., "A Relational Model of Data for Large Shared Data Banks," originally published in CACM, Jun. 1970, republished in "Readings in Database Systems," 3rd Edition edited by Michael Stonebraker and Joseph M. Hellerstein, 1998, pp. 5-15.

Patent Abstracts of Japan, 03173273 A, 1 page, Jul. 26, 1991.

Stephen Blott Lukas Relly Hans-Jorg Schek, Institute for Information Systems, "An Open Abstract-Object Storage System" SIGMOD, 16 pages, Montreal, Canada, 1996.

John Gaffney, Illustra Information Technologies, Inc., "An Illustra Technical White Paper", pp. 105-112, Oakland, CA, Mar., 1996.

Emma Stroud, Internet World, "Managing Your Assets", 7 pages, May 1, 2001.

ASAP Software, "Intelligent Asset Management", 5 pages, 2003.

OPTO 22, Snap-It "Effectively Managing Real-World Assets From IT", pp. 1-7, Temecula, CA, 2000.

"Final Office Action", U.S. Appl. No. 10/321,037, (Dec. 27, 2007),8 pages.

"Non-Final Office Action", U.S. Appl. No. 10/321,037, (Sep. 19, 2007),5 pages.

"Non-Final Office Action", U.S. Appl. No. 10/321,037, (Jan. 5, 2007),7 pages.

"Advisory Action", U.S. Appl. No. 10/321,037, (Sep. 8, 2006),3 pages.

"Final Office Action", U.S. Appl. No. 10/321,037, (May 10, 2006),7 pages.

"Non-Final Office Action", U.S. Appl. No. 10/321,037, (May 18, 2005),6 pages.

(56) References Cited

OTHER PUBLICATIONS

"Final Office Action", U.S. Appl. No. 10/321,107, (Nov. 21, 2008), 10 pages.
"Non-Final Office Action", U.S. Appl. No. 10/321,107, (Mar. 24, 2006), 7 pages.
"Advisory Action", U.S. Appl. No. 10/321,036, (Oct. 17, 2006), 3 pages.
"Final Office Action", U.S. Appl. No. 10/321,036, (Jul. 28, 2006), 12 pages.
"Non Final Office Action", U.S. Appl. No. 10/321,036, (Feb. 10, 2006), 11 pages.
"Non-Final Office Action", U.S. Appl. No. 10/321,036, (Sep. 15, 2005), 10 pages.
"Final Office Action", U.S. Appl. No. 10/321,117, (Mar. 23, 2007).
"Non-Final Office Action", U.S. Appl. No. 10/321,117, (Oct. 2, 2006), 9 pages.
"Final Office Action", U.S. Appl. No. 10/321,117, (Jan. 9, 2006), 8 pages.
"Non-Final Office Action", U.S. Appl. No. 10/321,117, (Aug. 2, 2005), 7 pages.
"Non-Final Office Action", U.S. Appl. No. 10/321,118, (Jul. 26, 2006), 8 pages.
"Non-Final Office Action", U.S. Appl. No. 10/464,176, (Jan. 22, 2009), 6 pages.
"Restriction Requirement", U.S. Appl. No. 10/464,176, (Jul. 15, 2008), 7 pages.
"Final Office Action", U.S. Appl. No. 10/464,176, (Nov. 16, 2006), 26 pages.
"Final Office Action", U.S. Appl. No. 10/464,176, (Aug. 4, 2009), 9 pages.
"Foreign Office Action", Chinese Application No. 02825544.5, (Jan. 22, 2010), 11 pages.
"Foreign Office Action", Chinese Application No. 02827159.9, (Jan. 29, 2010), 14 pages.
"Non-Final Office Action", U.S. Appl. No. 10/321,107, (Jan. 22, 2010), 10 pages.
"The Windows Interface, An Application Design Guide", *Microsoft Press*, (1992), p. 4.
"Foreign Office Action", Chinese Application No. 02825256.X, (Jan. 24, 2007), 4 pages.
"Foreign Office Action", Chinese Application No. 02825256.X, (Jul. 11, 2008), 8 pages.
"PCT International Search Report", PCT/US02/040817, (Mar. 27, 2003), 1 page.
"PCT International Preliminary Examination Report", PCT/US02/040817, (Jul. 19, 2004), 3 pages.
"PCT Written Opinion", PCT/US02/040617, (Sep. 22, 2006), 4 pages.
"PCT International Preliminary Examination Report", PCT/US2002/040816, (Sep. 19, 2003), 3 pages.
"PCT International Search Report", PCT/US2002/040611, (Mar. 27, 2003), 1 page.
"PCT International Preliminary Examination Report", PCT/US2002/040611, (Jul. 20, 2004), 3 pages.
"Non-Final Office Action", U.S. Appl. No. 12/723,327, (Dec. 27, 2010), 7 pages.
"Non-Final Office Action", U.S. Appl. No. 12/916,410, (Mar. 28, 2011), 11 pages.
"Notice of Allowance", U.S. Appl. No. 12/916,410, (Oct. 12, 2011), 8 pages.
"Foreign Notice of Rejection", Application Serial No. 02825256.X, (Feb. 13, 2009), 5 pages.
"Foreign Office Action", Application Serial No. 02827159.9, (Apr. 24, 2009), 10 pages.
"Examiners Answer to Appeal Brief", U.S. Appl. No. 10/321,107, (Nov. 5, 2010), 10 pages.
"PCT International Preliminary Examination Report", PCT/US02/040601, (Apr. 26, 2004), 3 pages.
"Foreign Office Action", Chinese Application No. 02825544.5, (Mar. 22, 2010), 11 pages.
"PCT International Search Report", PCT/US02/040820, (Sep. 18, 2003), 1 page.
"PCT International Search Report", PCT/US02/040617, (Apr. 28, 2004), 1 page.
"PCT International Search Report", PCT/US2002/040816, (Jun. 24, 2003), 2 pages.
"Final Office Action", U.S. Appl. No. 12/723,327, (Jun. 9, 2011), 8 pages.
"Advisory Action", U.S. Appl. No. 12/723,327, (Aug. 17, 2011), 3 pages.
United States Patent and Trademark Office, Non-Final Office Action, U.S. Appl. No. 13/243,983, mailed Oct. 1, 2012, 31 pages.
United States Patent and Trademark Office, Final Office Action, U.S. Appl. No. 13/417,064, mailed Nov. 8, 2012, 13 pages.
United States Patent and Trademark Office, Advisory Action, U.S. Appl. No. 13/417,064 mailed Jan. 24, 2013, 3 pages.
United States Patent and Trademark Office, Notice of Allowance, U.S. Appl. No. 13/417,064 mailed Mar. 5, 2013, 11 pages.
United States Patent and Trademark Office, Non-Final Office Action, U.S. Appl. No. 13/609,165, mailed Feb. 25, 2013, 22 pages.
Decision on Appeal, U.S. Appl. No. 10/321,107 (Feb. 24, 2012), 6 pages.
Notice of Allowance, U.S. Appl. No. 10/321,107, (May 2, 2012), 6 pages.
Non-Final Office Action, U.S. Appl. No. 13/417,064, (May 24, 2012), 10 pages.
Examiner's Answer to Appeal Brief, U.S. Appl. No. 12/723,327, (Jun. 8, 2012), 14 pages.
Notice of Allowance, U.S. Appl. No. 12/916,410, (Aug. 15, 2012), 7 pages.
United States Patent and Trademark Office, Final Office Action, U.S. Appl. No. 13/243,983, Apr. 2, 2013, 19 pages.
United States Patent and Trademark Office, Advisory Action, U.S. Appl. No. 13/243,983, Jul. 3, 2013, 3 pages.
United States Patent and Trademark Office, Notice of Allowance, U.S. Appl. No. 13/609,165, Jul. 29, 2013, 12 pages.
United States Patent and Trademark Office, Non-Final Office Action, U.S. Appl. No. 13/243,983, Nov. 7, 2013, 13 pages.
United States Patent and Trademark Office, Non-Final Office Action, U.S. Appl. No. 13/937,065, mailed Jan. 16, 2014, 14 pages.
United States Patent and Trademark Office, Notice of Allowance, U.S. Appl. No. 13/937,065, mailed Apr. 25, 2014, 8 pages.

\* cited by examiner

General Management Overview Report

| Location | Survey Complete | Asset Count | Installation Started | Installation Complete | QC Complete | QC Follow-up |
|---|---|---|---|---|---|---|
| Akron | 11/6/2002 | 38 | | | | |
| Albany | 10/3/2002 | 47 | 47 | 47 | 44 | |
| Albuquerque | | 30 | 30 | 30 | 28 | |
| Altoona | | 27 | | | | |
| Anchorage | 8/23/2002 | 25 | 24 | 24 | 15 | |
| Anderson (IP) | 10/9/2002 | 3 | 3 | 3 | 3 | |
| Andover (PW) | | 20 | 20 | 20 | 20 | 1 |
| Atlanta | 11/11/2002 | 157 | 157 | 157 | 127 | |
| Atlanta/North (AX) | | 65 | 43 | 43 | 43 | |
| Atlantic (VS) | 10/14/2002 | 4 | 4 | 4 | 4 | |
| Austin | 8/12/2002 | 75 | 68 | 68 | 69 | |
| Aventura | | 75 | 75 | 75 | 74 | |
| Bakersfield | | 26 | | | | |
| Bakersfield (EB) | | 1 | | | | |
| Baltimore | | 65 | | | | |
| Bangor (MH) | 9/24/2002 | 23 | 23 | 23 | 23 | |
| Baton Rouge | 11/4/2002 | 33 | 33 | 33 | 31 | |
| Beachwood | | 50 | | | | |
| Beaumont | 10/10/2002 | 33 | 33 | 33 | 31 | |
| Bedminster (MW) | | 20 | 20 | 20 | 20 | |
| Bel-Aire (H7) | 11/8/2002 | 10 | | | | |
| Bellevue | | 70 | 70 | 70 | 63 | |
| Bend (LL) | 8/28/2002 | 18 | 18 | 18 | 17 | |
| Bethesda | 11/7/2002 | 92 | | | | |
| Bethlehem (PY) | | 16 | 16 | 16 | 14 | |
| Beverly Hills | 10/11/2002 | 266 | 266 | 266 | 223 | 7 |
| BF Branch (Lab) | | 81 | 9 | 5 | 2 | |
| Billings | | 42 | 42 | 42 | 36 | |

ASSET TRANSITION PROJECT MANAGEMENT

This application is a continuation of U.S. patent application Ser. No. 10/321,037 filed Dec. 17, 2002 which claims priority based upon prior U.S. Provisional Patent Application Ser. No. 60/342,031 filed Dec. 18, 2001, the disclosures of which are both hereby incorporated by reference.

BACKGROUND

Large enterprises are faced with a daunting task when it comes to managing the network interconnected information technology resources of the enterprise. Each user within the enterprise demands up-to-date hardware devices. This fact, coupled with the proliferation of new hardware devices, such as PDAs, cell phones and laptops, creates an enormous problem when it comes to tracking each device. This also makes it difficult to determine whether the transition of a device, for example, the installation, replacement, disposition or maintenance of the device, is being conducted efficiently and properly. Moreover, the process of managing asset transitions becomes extremely complicated.

In many cases, such transaction activities are tracked manually. For example, after a technician performs an asset transition activity, he may record certain information concerning the activity either in manual or digital form. Thereafter, he may return to his office where he may record the information to either a handwritten log or a local computer database. Alternatively, the information may be called in or sent by e-mail to a central repository. In any event, there is a significant delay between the time the asset transition event occurs and the information is recorded into a data repository. A further limitation of the prior art is that the information collected by the technician may either be collected inaccurately or may be transferred inaccurately into the centralized repository. As a result of the foregoing limitations, information is not available to manage asset transition projects on a real-time basis. Consequently, a need exist for an improved method and system for asset transition project management.

SUMMARY

Various embodiments provide a method and system for asset transition project management. In some embodiments, information regarding an enterprise's assets is aggregated from a variety of sources into a computerized database. Thereafter, assets that are electronically connected to the computerized database are monitored. If a transition occurs, information concerning the transition is input into the computerized database on a real-time basis during the implementation of the transition. The information input into the computerized database can be used to manage the transition. As described throughout, the terms "assets", "hardware assets", and "electronic device assets" are used interchangeably.

In an embodiment, a method for managing asset transition projects comprises: providing a computerized database which stores asset transition project management information relating to an asset transition project, wherein the assets implicated in the asset transition project are computer network connected electronic device assets of an enterprise, and wherein the computerized database is electronically connected to the implicated electronic device assets, and wherein the stored asset transition project management information comprises: scheduling information relating to the asset transition project; and status information concerning a number of the implicated electronic device assets for which the transition has been started and has been completed; receiving by the computerized database over the electronic connection with the implicated electronic device assets of a communication from one of the implicated electronic device assets, the communication containing information indicating performance of an event at that one of the implicated electronic device assets associated with the asset transition project; updating the stored asset transition project management information relating to the asset transition project in the computerized database to account for the performance of the event at that one of the implicated electronic device assets; and generating a report based on the updated and stored asset transition project management information relating to the asset transition project in the computerized database which identifies asset transition project scheduling and completion information.

In an embodiment, a system for asset transition project management comprises: a computerized database which stores asset transition project management information relating to an asset transition project, wherein the assets implicated in the asset transition project are computer network connected electronic device assets of an enterprise, and wherein the computerized database is electronically connected to the implicated electronic device assets, and wherein the stored asset transition project management information comprises: scheduling information relating to the asset transition project; and status information concerning a number of the implicated electronic device assets for which the transition has been started and has been completed; means for receiving by the computerized database over the electronic connection with the implicated electronic device assets of a communication from one of the implicated electronic device assets, the communication containing information indicating performance of an event at that one of the implicated electronic device assets associated with the asset transition project; means for updating the stored asset transition project management information relating to the asset transition project in the computerized database to account for the performance of the event at that one of the implicated electronic device assets; and means for generating a report based on the updated and stored asset transition project management information relating to the asset transition project in the computerized database which identifies asset transition project scheduling and completion information.

In an embodiment, a method for asset transition project management comprises: creating a web based repository that includes a database storing asset information relating to network interconnected information technology hardware assets and planning and implementation information relating to a transition project for one or more of the hardware assets; wherein the stored asset information includes information defining a unique relationship between each hardware asset and its user; receiving from a certain hardware asset implicated by the transition project asset specific transition-related information indicative of implementation of the planned transition project occurs on that certain hardware asset; updating the asset information in the database with respect to that certain hardware asset to include the received asset specific transition-related information; processing the asset information and transition-related information stored in the database to manage completion of the planned transition project through the generation of reports which summarize overall transition project status and identify instances of exception to completion of the planned transition project; and allowing an asset transition project manager with respect to the exception to drill down in the generated report to detailed user information stored in the database relating to a particular hardware asset involved in the transition which is associated with the exception.

In another embodiment, a method for asset transition project management comprises: creating a computerized database, said computerized database containing information relating to network interconnected information technology hardware assets; wherein said hardware assets are selected from the group consisting of desktop computers, laptop computers, handheld computers, networking devices and storage devices; and wherein the stored information specifies, for each network interconnected hardware asset being transitioned, a unique identification of the user of the hardware asset, an identification of the hardware asset, an identification of a transition schedule for the hardware asset, and an identification of user software application information on the hardware asset; monitoring transitions of said hardware assets; updating the stored information in said computerized database on a real-time basis through communications over the network during the implementation of said transition to account for changes caused by said transition; and generating reports for use by an asset transition project manager based on the updated and stored information in the computerized database which identify the hardware assets implicated in the transition, scheduling of the transition and completion status of the transition, and allow the asset transition project manager to review, for each identified hardware asset in the transition project, the identification of the user of the hardware asset and the identification of user software application information on the hardware asset.

BRIEF DESCRIPTION OF THE DRAWINGS

Various embodiments will be described with reference to the accompanying drawings, which show important sample embodiments and which are incorporated in the specification hereof by reference, wherein:

FIG. 3 illustrates a screen display showing the content of the Management Status by Location report;

FIG. 4 illustrates a screen display showing the content of the Management Status by Group report.

DETAILED DESCRIPTION

The numerous innovative teachings of the present application will be described with particular reference to the present embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
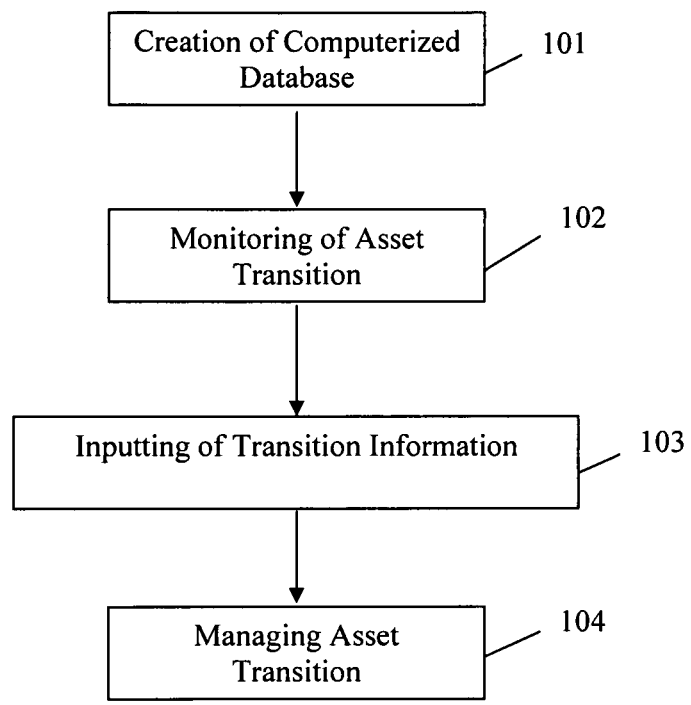
FIG. 1 illustrates a method of asset transition project management.

FIG. 1 illustrates a work flow process for an embodiment of the asset transition project management method. The first step in the method is the creation of a computerized database 101. The computerized database 101 will contain substantive information concerning assets owned by the enterprise. The computerized database 101 may be, for example, a relational database. In addition, the database may be located remotely from the location of the asset transition. Information included in the computerized database may include, for example, asset ownership information, usage information, user information, legacy asset information, new asset information, software application information, financial information, site information, event history information and logistical information. The database may include information on such assets as desktop computers, laptop computers, hand-held computers, printers, scanners, networking devices and storage devices. All assets are electronically connected to the computerized database 101.

Once a thorough, comprehensive, computerized database 101 has been created, the assets that are electronically connected to the computerized database 101 are monitored to determine whether an asset transition 102 has occurred. An asset transition 102 may be an event such as an asset installation, asset relocation, asset disposition or asset maintenance activity. Information from the asset transition 102 may be transmitted to the computerized database 101 through, for example, the Internet or a local area network. In addition, the transmission may occur by secure, encrypted means.

Upon the occurrence of an asset transition 102, information relating to the asset transition is transmitted electronically to the computerized database 101 thereby inputting transition information 103 into the computerized database 101 on a real-time basis. The information is transmitted to the computerized database 101 concurrently with and as a part of the asset transition 102. By instantaneously and simultaneously inputting transition information 103 into the computerized database 101, any delay in updating the database is eliminated. Thereafter, information in the computerized database can be used to manage asset transition activities 104. The types of activities that may be managed as part of the aforesaid management may include, for example, installation management, relocation management, lease management, exception management, scheduling management, workflow management and resource management. In addition, reports may be generated to assist with the project management activities. Reports may include, for example, status by location, status by group, hardware mix by site, user software, warehouse status by group, technical status, asset reconciliation, asset disposition and user satisfaction survey.

Figure 2:
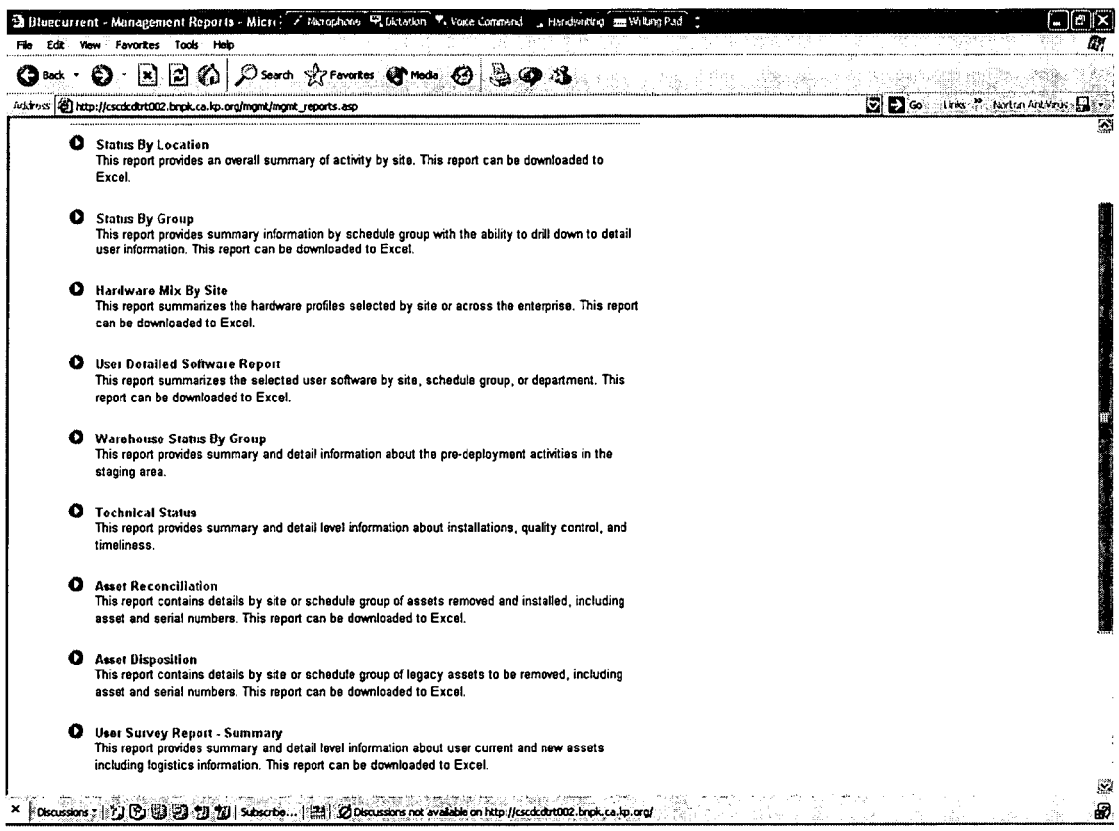
FIG. 2 illustrates a screen display identifying the types of reports available to the user.

FIG. 2 illustrates a screen display identifying the types of reports available to the user. Typical reports include: a Status by Location report which provides an overall summary of activity by site; a Status by Group report which provides summary information by schedule group with the ability to drill down to detailed user information for those users within the schedule group; a Hardware Mix by site report which summarizes the hardware profiles selected by site or enterprise-wide; a User Detailed Software Report which summarizes the selected user software by site, schedule group or department; a Warehouse Status by Group report which provides summary and detail information about pre-deployment activities in the staging area; a Technical Status report which provides summary and detail level information about installations, quality control and timeliness; an Asset Reconciliation report which provides details by site or schedule group of assets removed and installed including asset and serial numbers; an Asset Disposition report which contains details by site or schedule group of legacy assets to be removed including asset and serial numbers; and a User Survey report which provides summary and detail level information about user current and new assets including logistics information. Because all information in the computerized database 101 is updated on a real-time basis, all information and all reports are up to date and accurate at all times.

FIG. 3 illustrates a screen display showing the content of the Management Status by Location report. The display provides a general management overview, on a per location basis, for a given enterprise, of such information as the date the survey was completed, the asset count at that location, the number of installations started at that location, the number of installations completed at that location, the number that have completed quality control and the number that require quality control follow-up.

Figure 4:
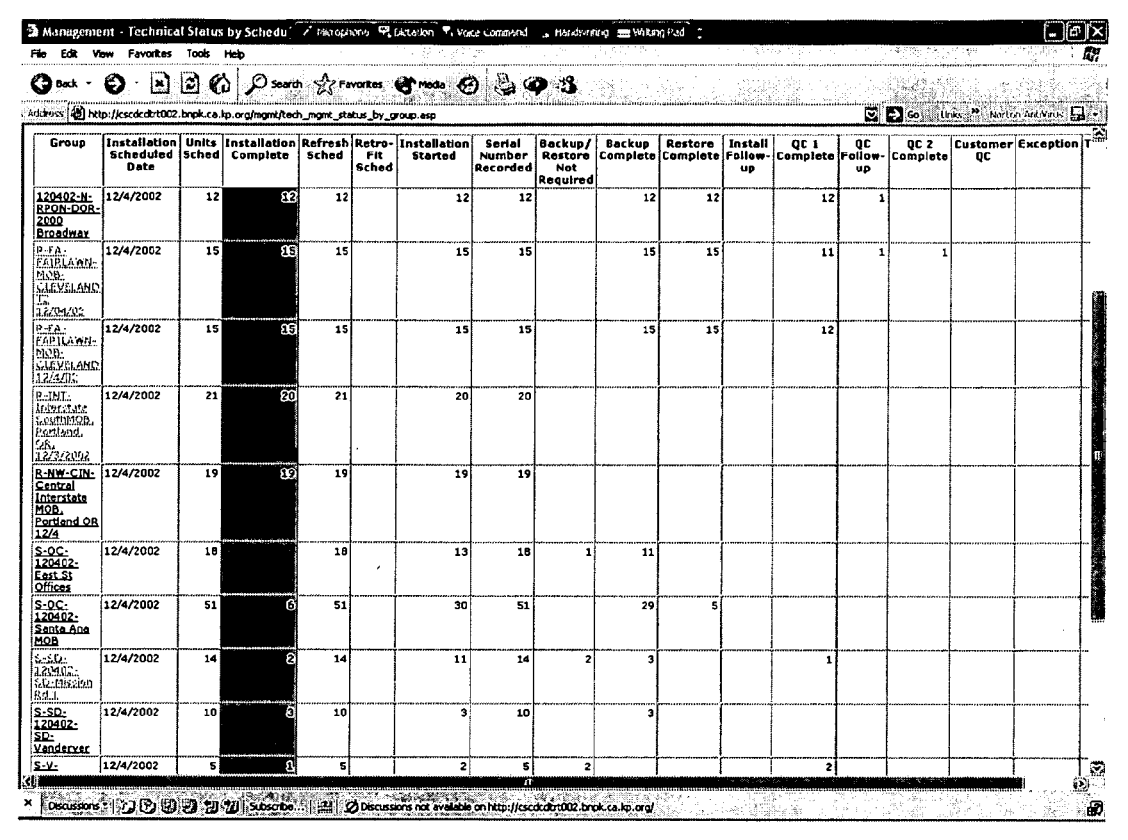

FIG. 4 illustrates a screen display showing the content of the Management Status by Group report. The display provides such information as the installation schedule date, the number of units scheduled for that installation, the number of installations that have been completed, the number of installations that have been started, the number of serial numbers recorded, whether backup or restore of the asset is required, the number of backups and restores that have been completed, whether an installation follow-up is needed, and quality control information, in each case by group.

Figure 5:
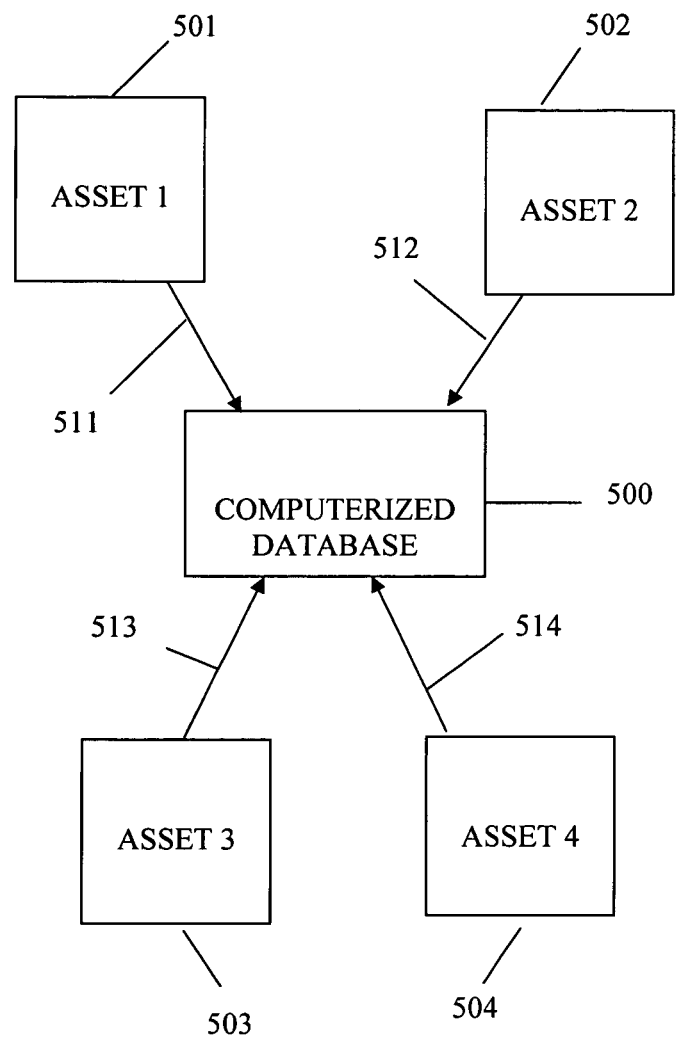
FIG. 5 illustrates a system for asset transition project management.

FIG. 5 illustrates an embodiment for a system for asset transition project management. A series of assets 501, 502, 503 and 504 are attached to a computerized database 500. Each of the assets 501, 502, 503 and 504 are electronically connected 511, 512, 513 and 514 to the computerized database 500. The computerized database 500 may be located remotely from the assets 501, 502, 503 and 504. If so, transmission of information from the computerized database 500 to the assets 501, 502, 503 and 504 may be through the Internet or through a local area network. In addition, transmission of information between the assets 501, 502, 503 and 504 may be made in a secure, encrypted manner. The assets 501, 502, 503 and 504 may be such as assets as desktop computers, laptop computers, hand-held computers, printers, scanners, network devices and storage devices.

The system provides a means for monitoring the transition of the assets 501, 502, 503 and 504. An asset transition may include an asset installation, asset relocation, asset maintenance activity or asset disposition. When an asset transition occurs, the system provides a means for inputting new information relating to the transition into the computerized database 500 concurrently with implementation of the transition of the assets. The information in the computerized database 500 is continuously and simultaneously updated.

Because the information in the computerized database 500 is current and up to date on a real-time basis, the information in the database can be used to manage asset transition activity. The type of management activities that may be performed using the information in the computerized database 500 may include, for example, installation management, relocation management, lease management, exception management, scheduling management, workflow management and resource management. In addition, the information in the computerized database 500 may be used to generate reports such as status by location, status by group, hardware mix by site, user software, warehouse status by group, technical status, asset reconciliation, asset disposition and user survey.

We claim:

1. A method comprising:
receiving a communication that indicates performance of a handheld computer asset transition event during an asset transition project, the asset transition event associated with the handheld computer asset's relocation, maintenance, and disposition, wherein the communication is received concurrently with the handheld computer asset's complete or partial performance of the asset transition event;
updating in a repository information from the communication, wherein the information contains results of actions taken by the handheld computer asset in furtherance of completing the transition event; and
producing a report from the information, wherein the report:
reflects a current status of the transition event, and
supports selectable indicia for displaying multiple levels of information particular to the handheld computer asset, wherein a first level of the information is the location of the handheld communication device.

2. The method of claim 1, wherein receiving the communication includes receiving a communication that includes at least one of: user information, legacy asset information, new asset information, software application information, financial information, site information, event history information, logistical information, ownership information, or usage information.

3. The method of claim 1, wherein receiving the communication indicating performance of a transition event includes receiving a communication indicating performance of a transition event involving the handheld computer assets and a second handheld computer asset.

4. The method of claim 1, wherein receiving the communication includes receiving the communication through the Internet.

5. The method of claim 1, wherein receiving the communication includes receiving the communication through a local area network.

6. The method of claim 1, wherein receiving the communication includes receiving the communication through a secure, encrypted transmission.

7. The method of claim 1, further comprising managing the asset transition project using a management activity comprising at least one of: an installation management, a relocation management, a lease management, an exception management, a scheduling management, a workflow management, or a resource management.

8. The method of claim 1, wherein producing the report is based on the updated and stored asset transition project management information, wherein generating the report includes generating at least one of: a status by location report, a status by group report, a hardware mix by site report, a user software report, a warehouse status by group report, a technical status report, an asset reconciliation report, an asset disposition report, or a user survey report.

9. A computing device comprising:
a central processing unit; and
computer-readable storage device comprising instructions that, under the influence of the processor, perform a method comprising:
receiving a communication that indicates performance of a handheld computer asset transition event during an asset transition project, the asset transition event associated with the handheld computer asset's relocation, maintenance, and disposition, wherein the communication is received concurrently with the handheld computer asset's complete or partial performance of the transition event;
updating in a repository information from the communication, wherein the information contains results of actions taken by the handheld computer asset in furtherance of completing the transition event; and
producing a report from the information, wherein the report:

reflects a current status of the asset transition event, and supports selectable indicia for displaying multiple levels of information particular to the handheld computer asset, wherein a first level of the information is the location of the handheld communication device.

10. The computing device of claim 9, wherein receiving the communication includes receiving a communication that includes at least one of: user information, legacy asset information, new asset information, software application information, financial information, site information, event history information, logistical information, ownership information, or usage information.

11. The computing device of claim 9, wherein receiving the communication indicating performance of a transition event includes receiving a communication indicating performance of a transition event involving the handheld device and at least one of: a laptop computer, a handheld computer, a networking device, or a storage device.

12. The computing device of claim 9, wherein receiving the communication includes receiving the communication through the Internet.

13. The computing device of claim 9, wherein receiving the communication includes receiving the communication through a local area network.

14. The computing device of claim 9, wherein receiving the communication includes receiving the communication through a secure, encrypted transmission.

15. The computing device of claim 9, wherein producing the report is based on the updated and stored asset transition project management information, wherein producing the report includes generating at least one of: a status by location report, a status by group report, a hardware mix by site report, a user software report, a warehouse status by group report, a technical status report, an asset reconciliation report, an asset disposition report, or a user survey report.

16. A method comprising:
receiving asset specific transition-related information indicative of an implementation of a transition of a handheld communication device, the transition including the handheld communication device relocation, status, and disposition, wherein the asset specific transition-related information is received concurrently with the implementation of the handheld communication device's transition; and
updating asset information stored in a database for the handheld communication device to include the received asset specific transition-related information, wherein the information contains results of actions taken by the handheld communication device in furtherance of completing the transition including producing reports, wherein the reports include selectable links for displaying multiple levels of information particular to the handheld communication device, and wherein a first level of information is the location of the handheld communication device.

17. A method comprising:
creating a web based information repository to store a specification associated with a plurality of network interconnected computerized assets, wherein at least one of the plurality of networked interconnected computerized assets is a handheld computer asset; and
using said repository to facilitate a transition event for the handheld computer asset, the transition event including an asset relocation, an asset maintenance, and an asset disposition, wherein using comprises:
storing in the repository information associated with actions taken to complete the transition event for the handheld computer asset, wherein the information is received from the one or more of the plurality of network interconnected computerized assets and stored in the repository concurrently with taking the actions to complete the transition event, wherein the information contains results of actions taken by the handheld computer asset in furtherance of completing the transition event; and
producing a report from the information, wherein the report supports multiple levels of selectable information particular to the handheld computer asset, and wherein a first level of the information is the location of the handheld communication device.

18. A computing-device comprising:
means for receiving a communication that indicates performance of a handheld computer asset transition event during an asset transition project, the asset transition event associated with the handheld computer asset's relocation, maintenance, and disposition, wherein the communication is received concurrently with the handheld computer asset's complete or partial performance of the asset transition event;
means for updating in a repository information from the communication, wherein the information contains results of actions taken by the handheld computer asset in furtherance of completing the transition event, wherein the information includes the location of the handheld computer asset; and
means for producing a report from the information, wherein the report:
reflects a current status of the transition event, and
supports selectable indicia for displaying multiple levels of information particular to the handheld computer asset, wherein a first level of the information is the location of the handheld communication device.

* * * * *